United States Patent
Park (10) Patent No.: US 8,045,523 B2
(45) Date of Patent: Oct. 25, 2011

(54) METHOD AND APPARATUS FOR PERFORMING MEDIA INDEPENDENT HANDOVER

(75) Inventor: Soo-hong Park, Gwangju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 677 days.

(21) Appl. No.: 11/877,734

(22) Filed: Oct. 24, 2007

(65) Prior Publication Data

US 2008/0175202 A1  Jul. 24, 2008

Related U.S. Application Data

(60) Provisional application No. 60/881,521, filed on Jan. 22, 2007.

(30) Foreign Application Priority Data

May 4, 2007  (KR) ........................ 10-2007-0043731

(51) Int. Cl.
*H04W 4/00*  (2009.01)
*H04W 36/00*  (2009.01)
(52) U.S. Cl. ..... 370/331; 370/328; 370/329; 455/422.1; 455/436; 455/439
(58) Field of Classification Search .................. 370/331, 370/401, 310, 349, 329, 328, 338; 455/422.1, 455/436, 439, 440, 441, 442, 443, 444, 33.2; 379/60
See application file for complete search history.

(56) References Cited

U.S. PATENT DOCUMENTS

2005/0249161 A1 * 11/2005 Carlton ........................ 370/331
2006/0227747 A1 * 10/2006 Kim et al. ..................... 370/331

OTHER PUBLICATIONS

International Search Report and Written Opinion issued in corresponding PCT International Application No. PCT/KR2007/005935 dated Mar. 23, 2008.
Y. Kawarasaki et al., "IPv6 SIP internetworking methods in dual-stack network", The 9$^{th}$ Asia-Pacific Conference on Communications, 2003, APCC 2003, Sep. 2003, pp. 1124-1128.
T. Henriksson et al., "Specification of a configurable general-purpose protocol processor", IEEE Proc.-Circuits Devices Systems, vol. 149, No. 3, Jun. 2002, pp. 198-202.

* cited by examiner

*Primary Examiner* — Kwang B Yao
*Assistant Examiner* — Adam Duda
(74) *Attorney, Agent, or Firm* — Staas & Halsey LLP (57) ABSTRACT

A technology of detecting MIHP information before an OSI layer 3 process is performed. A method of performing Media Independent Handover (MIH) includes analyzing a field for indicating Internet Protocol (IP) version information, if a value of the field for indicating IP version information corresponds to an MIH layer, performing a process of the MIH layer and performing a process of an IP layer, and if a value of the field for indicating IP version information does not correspond to the MIH layer, directly performing the process of the IP layer. Accordingly, an IP layer that is the third layer of the OSI 7 layers can determine without performing a separate operation whether an MIH process is performed. Thus, a delay of a processing speed of a device can be prevented, resulting in an increase of QoS of a network.

13 Claims, 6 Drawing Sheets

METHOD AND APPARATUS FOR PERFORMING MEDIA INDEPENDENT HANDOVER

CROSS-REFERENCE TO RELATED APPLICATIONS

This application claims all benefits accruing under 35 U.S.C. §119 from Korean Patent Application No. 2007-43731, filed in the Korean Intellectual Property Office on May 4, 2007, and the benefit of U.S. Provisional Patent Application No. 60/881,521, filed in the U.S. Patent and Trademark Office on Jan. 22, 2007, the disclosures of which are incorporated herein by reference.

BACKGROUND OF THE INVENTION

1. Field of the Invention

Aspects of the present invention relate to wireless communication, and more particularly, to a method and apparatus for performing Media Independent Handover (MIH).

2. Related Art

Figure 1:
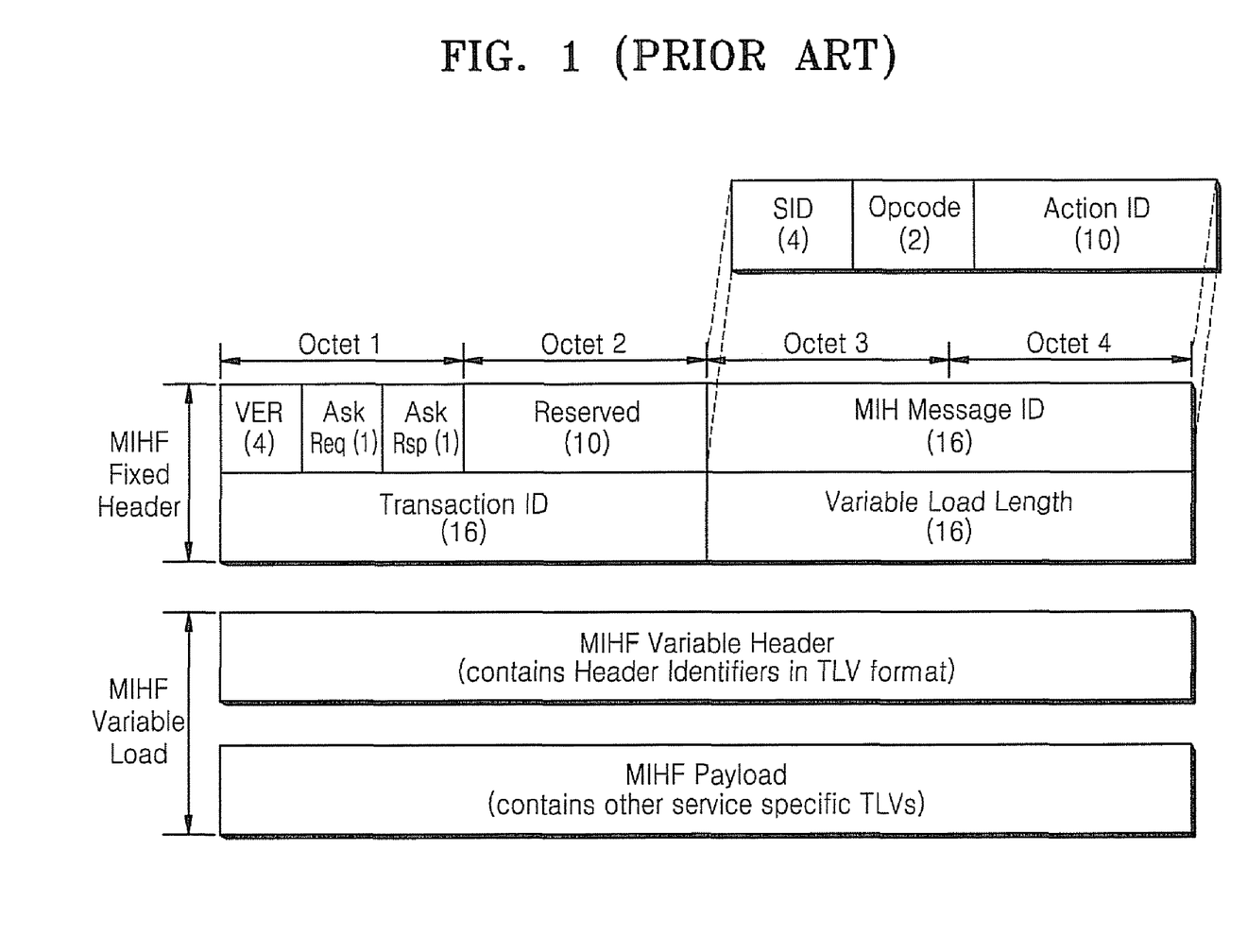
FIG. 1 illustrates a conventional format of a Media Independent Handover Protocol (MIHP) header.

The IEEE 802.21 standard defines a Media Independent Handover Protocol (MIHP). In order to use the MIHP, a newly defined MIHP header must be inserted between an OSI layer 2 header and an OSI layer 3 header of a packet. FIG. 1 illustrates a conventional format of an MIHP header.

However, currently used packets include only information about an OSI layer 2 header and an OSI layer 3 header, and do not indicate whether an MIHP header is included in each packet. Thus, according to the conventional standard, there is no method used by network devices to determine whether the MIHP is used. Thus, if only information provided by the OSI layer 2 is used, Media Independent Handover (MIH) cannot be performed. In order for a network device to perform the MIHP defined in IEEE 802.21, a separate operation is needed. This separate operation results in a delay of a processing speed of the network device and a corresponding degradation of Quality of Service (QoS) of the network.

SUMMARY OF THE INVENTION

Aspects of the present invention provide a method and apparatus to perform Media Independent Handover (MIH), by which Media Independent Handover Protocol (MIHP) information included in a packet is detected before an OSI layer 3 process is processed, and a computer readable recording medium storing a computer readable program to execute the method.

Additional aspects and/or advantages of the invention will be set forth in part in the description which follows and, in part, will be obvious from the description, or may be learned by practice of the invention.

Aspects of the present invention also provide an information storage medium in which a data format of a message for performing MIH is included.

According to an aspect of the present invention, a method of performing Media Independent Handover (MIH) by a network device is provided. The method comprises analyzing a field of a packet received by the network device indicating Internet Protocol (IP) version information; performing a process of an MIH layer and performing a process of an IP layer if a value of the field indicating IP version information corresponds to an MIH layer; performing the process of the IP layer directly if a value of the field for indicating IP version information does not correspond to the MIH layer; and performing MIH based on the results of processing of the MIH layer and the IP layer.

According to another aspect of the present invention, the field indicating IP version information may be included in a Media Access Control (MAC) header.

According to another aspect of the present invention, the field indicating IP version information may be an EtherType field.

According to another aspect of the present invention, a method of performing Media Independent Handover (MIH) by network device is provided. The method comprises analyzing a field of a packet received by the network device indicating Internet Protocol (IP) version information; performing a process of a corresponding layer according to whether an MIH header is included in a packet if a value of the field indicating IP version information indicates an IP version 4 (IPv4); performing a process of the corresponding layer according to whether an MIH header is included in a packet if the value of the field indicating IP version information indicates an IP version 6 (IPv6).

According to another aspect of the invention, the performing of the process if a value of the field indicating IP version information indicates an IP version 4 (IPv4) comprises determining whether an MIH header is included in the packet; performing a process of an MIH layer and performing a process of an IPv4 layer if an MIH header is included in the packet; and performing the process of the IPv4 layer directly if an MIH header is not included in the packet.

According to another aspect of the invention, the performing of the process if a value of the field indicating IP version information indicates an IP version 6 (IPv6) comprises determining whether an MIH header is included in the packet; performing a process of an MIH layer and performing a process of an IPv6 layer if an MIH header is included in the packet; and directly performing the process of the IPv6 layer if an MIH header is not included in the packet.

According to another aspect of the present invention, an apparatus to perform Media Independent Handover (MIH) is provided. The apparatus comprises a Media Access Control (MAC) header processing unit to analyze a field of a packet received by the apparatus indicating Internet Protocol (IP) version information; an MIH layer processing unit to perform a process of an MIH layer if a value of the field indicating IP version information corresponds to the MIH layer; an IP layer processing unit to perform a process of an IP layer after performing the process of the MIH layer if the value of the field indicating IP version information corresponds to the MIH layer, and to perform the process of the IP layer directly if the value of the field for indicating IP version information does not correspond to the MIH layer; and a handover unit to perform MIH based on the results of the MAC header processing unit, the MIH layer processing unit, and the IP layer processing unit.

According to another aspect of the present invention, an apparatus to perform Media Independent Handover (MIH) is provided. The apparatus comprises a Media Access Control (MAC) header processing unit to analyze a field of a packet received by the apparatus indicating Internet Protocol (IP) version information; an MIH layer processing unit to perform a process of an MIH layer if an MIH header is included in a packet; an IP version 4 (IPv4) processing unit to perform a process of an IPv4 layer if a value of the field indicating IP version information indicates IPv4, and to transmit the packet to the MIH layer processing unit if the MIH header is included in the packet; an IPv6 layer processing unit to perform a process of an IPv6 layer if the value of the field indicating IP version information indicates IPv6, and to transmit the packet to the MIH layer processing unit if the MIH header is included in the packet; and a handover unit to perform MIH based on the results of the MAC header processing unit, the MIH layer processing unit, the IPv4 processing unit, and the IPv6 processing unit.

According to another aspect of the present invention, a computer readable medium in which a data format of a message for performing Media Independent Handover (MIH) is provided. The message comprises a Media Access Control (MAC) header comprising a field indicating Internet Protocol (IP) version information and an MIH protocol (MIHP) header, wherein the field indicating IP version information contains a value indicating that an MIHP is included in the message.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
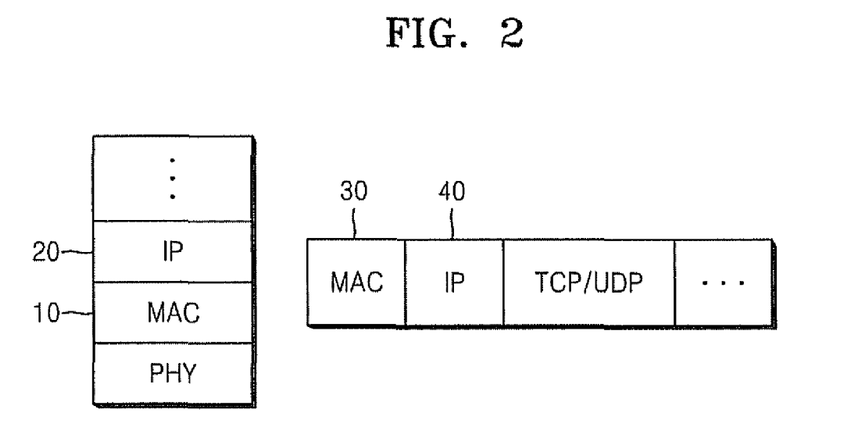
FIG. 2 illustrates OSI layers and a message packet format when an MIHP header is not included in a message packet.
Figure 3:
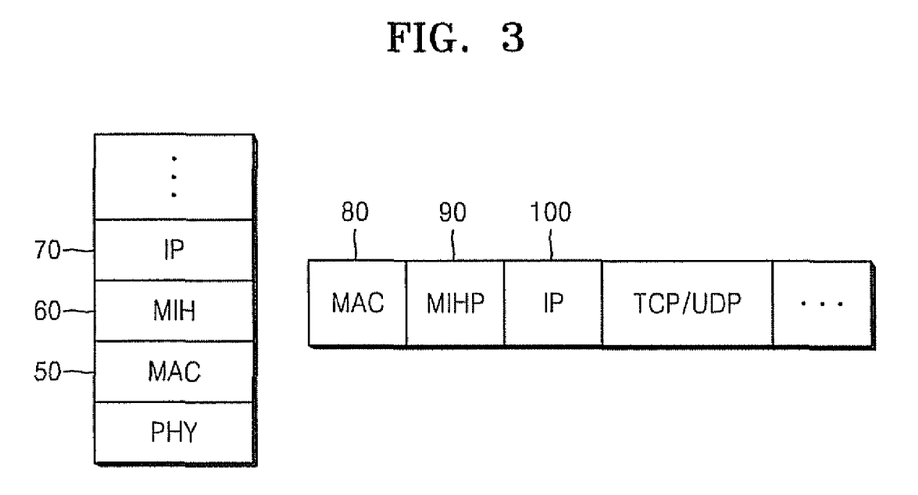
FIG. 3 illustrates OSI layers and a message packet format when an MIHP header is included in a message packet.

A case where an MIH protocol (MIHP) header is not included in a packet and a case where an MIHP header is included in a packet are compared to each other with reference to FIGS. 2 and 3. FIG. 2 shows OSI layers and a message packet format when an MIHP header is not included in a message packet. As shown in FIG. 2, if an MIHP header is not included in a packet, the packet has a Media Access Control (MAC) header 30 and an Internet Protocol (IP) header 40, which may be disposed adjacent to one another. Thus, according to the OSI 7 layer model, immediately after a process of a MAC layer 10 is performed, a process of an IP layer 20 is performed, without performing a process of an MIH layer.

However, if an MIHP header is included in a packet, a process of an MIH layer must be performed. FIG. 3 shows OSI layers and a message packet format when an MIHP header is included in a message packet. As shown in FIG. 3, an MIHP header 90 is disposed between a MAC header 80 and an IP header 100. Thus, according to the OSI 7 layer model, a process of an MAC layer 50 is performed, a process of an MIH layer 60 is performed, and a process of an IP layer 70 is performed.

A header of the second layer of the OSI 7 layer model contains information defining a type of a protocol of the third layer adjacent to the header of the second layer in a packet. This will now be described with respect to an IEEE 802.3 MAC header.

Figure 4:
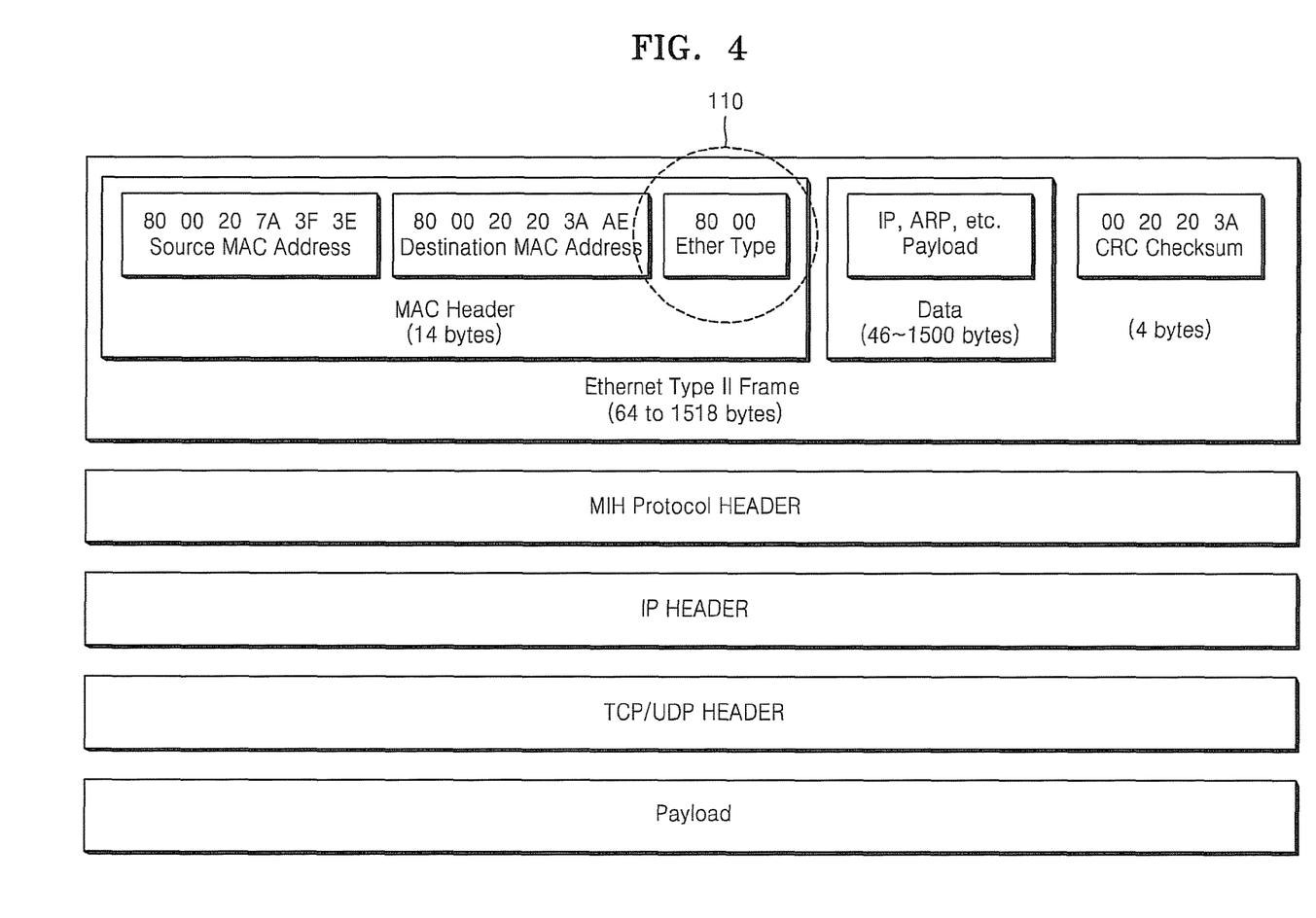
FIG. 4 illustrates a format of an IEEE 802.3 Media Access Control (MAC) header.

FIG. 4 shows a format of an IEEE 802.3 MAC header. The packet shown in FIG. 4 includes MAC layer information, an MIHP header, an IP header, a Transmission Control Protocol (TCP) or User Datagram Protocol (UDP) header, and a payload. The payload is a portion remaining after stripping (or removing) the headers from the packet and contains an actual data portion of the packet.

As shown in FIG. 4, the MAC header includes an EtherType field 110. The EtherType field 110 indicates version information of an IP layer. For example, if a value of the EtherType field 110 is '0x0800', IP information included in the packet is IP version 4 (IPv4) information. However, if the value of the EtherType field 110 is '0x86DD', the IP information included in the packet is IPv6 information. The EtherType field 110 conventionally has only one of the two values.

According to an example embodiment of the present invention, a new value is assigned to an EtherType field in order to indicate that an MIHP header is included in a packet. Thus, the EtherType field can have one of three values. One is a value indicating IPv4, one is a value indicating IPv6, and one is a value indicating MIHP. Any value may be assigned to indicate MIHP, other than '0x0800' (indicating IPv4) and '0x86DD' (indicating IPv6). For example, as illustrated in FIG. 4, '0x8000' can be assigned as the value indicating MIHP. Other values may be used as well, according to other aspects of the present invention.

Figure 5:
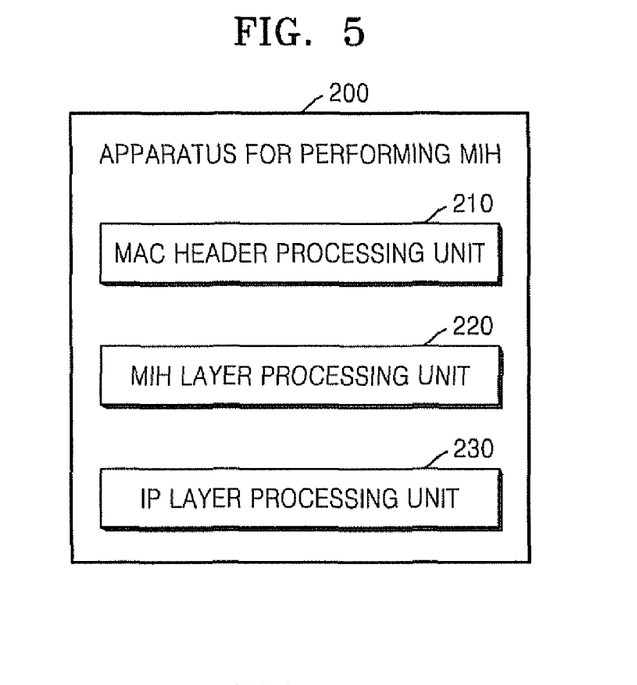
FIG. 5 is a block diagram of an apparatus for performing MIH according to an example embodiment of the present invention.

FIG. 5 is a block diagram of an apparatus 200 for performing MIH according to an example embodiment of the present invention. The apparatus 200 includes a MAC header processing unit 210, an MIH layer processing unit 220, and an IP layer processing unit 230. According to other aspects of the present invention, the apparatus 200 may include additional and/or different components as well. Similarly, the functionality of one or more of the above units may be incorporated into a single component. The apparatus 200 may be a server, a router, a client device, or any other node in a network. The network may be any network utilizing MIHP, including wired and/or wireless networks.

The MAC header processing unit 210 analyzes a field indicating IP version information contained in a header of a protocol corresponding to the second layer of the OSI 7 layer model in a packet. The MIH layer processing unit 220 performs a process of an MIH layer if a value of the field indicating IP version information corresponds to the MIH layer.

The IP layer processing unit 230 performs a process of an IP layer after the MIH layer processing unit 220 performs the process of the MIH layer if the value of the field indicating IP version information corresponds to the MIH layer, or performs the process of the IP layer directly if the value of the field indicating IP version information does not correspond to the MIH layer.

The second layer of the OSI 7 layer model may be the MAC layer, and the field indicating IP version information may be the EtherType field. Hereinafter, it is assumed that the second layer of the OSI 7 layer model is the MAC layer, and the field indicating IP version information is the EtherType field, although this need not be the case according to other aspects of the present invention.

Figure 6:
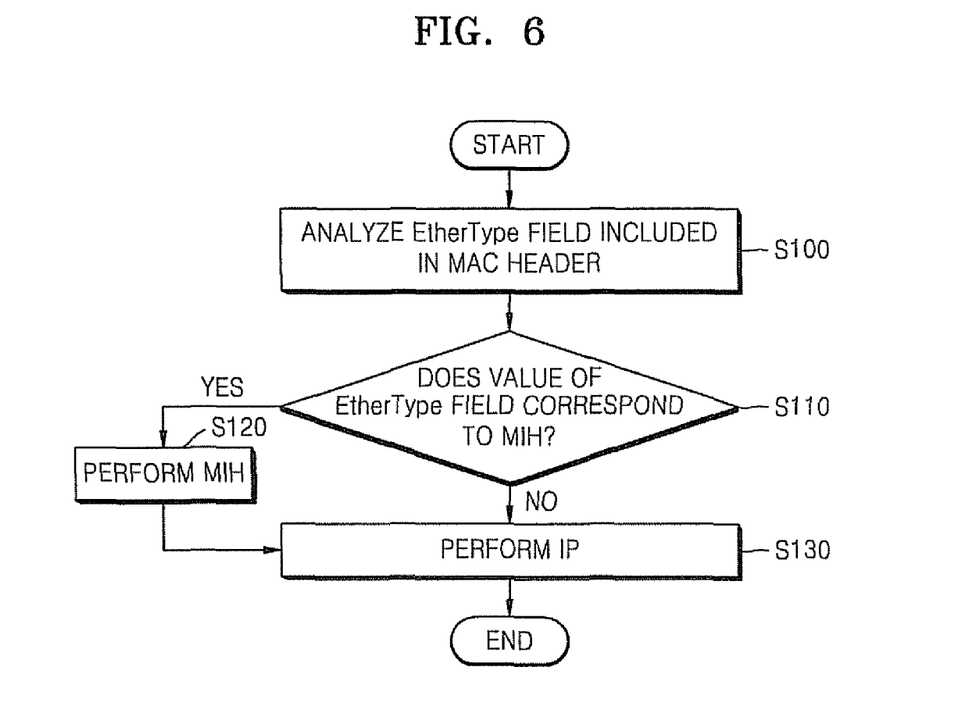
FIG. 6 is a flowchart of a process of performing MIH according to an example embodiment of the present invention.

FIG. 6 is a flowchart of a process of performing MIH according to an example embodiment of the present invention. At block S100, the MAC header processing unit 210 analyzes an EtherType field included in a MAC field in a packet. The MAC header processing unit 210 transmits the packet to a module performing a process of a layer corresponding to a value of the EtherType field at block S10.

If the value of the EtherType field corresponds to MIH, the MAC header processing unit 210 transmits the packet to the MIH layer processing unit 220. The MIH layer processing unit 220 performs a process of an MIH layer at block S120 and transmits the packet to the IP layer processing unit 230. The IP layer processing unit 230 performs a process of an IP layer in operation S130 after the MIH layer processing unit 220 performs the process of the MIH layer.

If the value of the EtherType field does not correspond to MIH, i.e., if the value of the EtherType field corresponds to IP, the MAC header processing unit 210 transmits the packet directly to the IP layer processing unit 230. The IP layer processing unit 230 performs the process of the IP layer at block S130.

According to another example embodiment of the present invention, a new value is not assigned to the EtherType field. Instead, by decoding a header disposed next to a MAC header in a packet before a process of an IP layer is performed, the presence of an MIH header may be determined.

Figure 7:
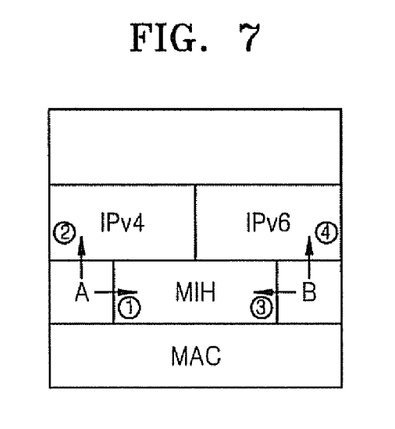
FIG. 7 is a diagram describing a packet transfer between OSI layers according to another example embodiment of the present invention.

FIG. 7 is a diagram describing a packet transfer between OSI layers according another example embodiment of the present invention. As shown in FIG. 7, when a process of an MIH layer is performed, IP version information is detected by analyzing an EtherType field.

If an IP version is IPv4, a packet is transferred to a module A. The module A determines whether an MIH header is included in the packet. If the MIH header is included in the packet, the packet is transferred from the module A to an MIH processing module (shown by ①). After the MIH processing module performs the process of the MIH layer, the packet is transferred to an IPv4 processing module. If the MIH header is not included in the packet, the packet is transferred from the module A directly to the IPv4 processing module (shown by ②).

If the IP version is IPv6, the packet is transferred to a module B. The module B determines whether an MIH header is included in the packet. If the MIH header is included in the packet, the packet is transferred from the module B to the MIH processing module (shown by ③). After the MIH processing module performs the process of the MIH layer, the packet is transferred to an IPv6 processing module. If the MIH header is not included in the packet, the packet is transferred from the module B to the IPv6 processing module directly (shown by ②).

Figure 8:
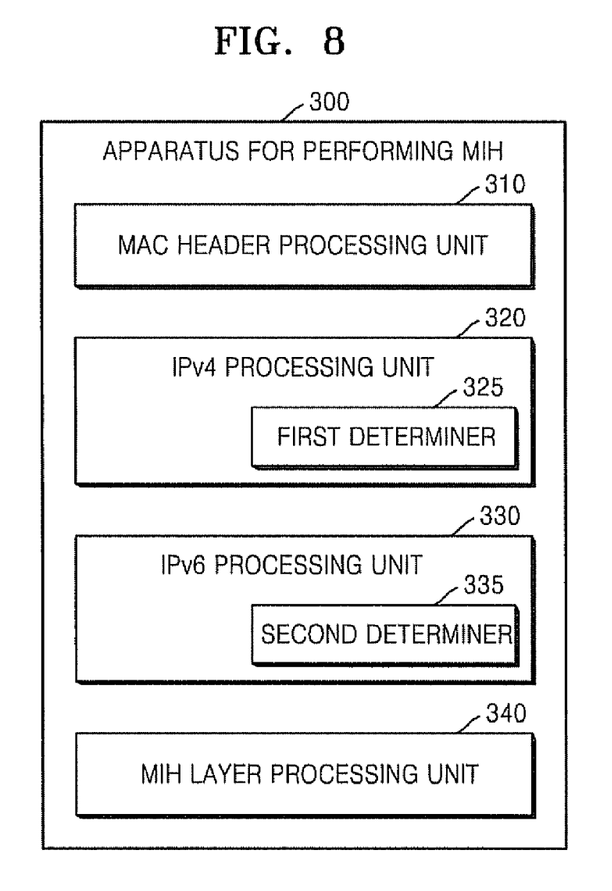
FIG. 8 is a block diagram of an apparatus for performing MIH according to another example embodiment of the present invention.

FIG. 8 is a block diagram of an apparatus 300 to perform MIH according to another example embodiment of the present invention. The apparatus 300 includes a MAC header processing unit 310, an IPv4 processing unit 320, an IPv6 processing unit 330, and an MIH layer processing unit 340. The MAC header processing unit 310 analyzes a field indicating IP version information contained in a header of a protocol corresponding to the second layer of the OSI 7 layers in a packet.

The IPv4 processing unit 320 performs a process of an IPv4 layer if a value of the field indicating IP version information indicates IPv4. If an MIH header is included in the packet, the IPv4 processing unit 320 transmits the packet to the MIH layer processing unit 340 so that the MIH layer processing unit 340 performs a process of an MIH layer. The IPv4 processing unit 320 may include a first determiner 325 to determine whether the MIH header is included in the packet and to transmit the packet to the MIH layer processing unit 340 if the MIH header is included in the packet. The first determiner 325 may correspond to the module A shown in FIG. 7.

The IPv6 processing unit 330 performs a process of an IPv6 layer if the value of the field indicating IP version information indicates IPv6. If an MIH header is included in the packet, the IPv6 processing unit 330 transmits the packet to the MIH layer processing unit 340 so that the MIH layer processing unit 340 performs the process of the MIH layer. The IPv6 processing unit 330 may include a second determiner 335 to determine whether the MIH header is included in the packet and to transmit the packet to the MIH layer processing unit 340 if the MIH header is included in the packet. The second determiner 335 may correspond to the module B shown in FIG. 7.

The MIH layer processing unit 340 performs the process of the MIH layer if an MIH header is included in the packet.

As described above, the second layer of the OSI 7 layer model may be the MAC layer, and the field indicating IP version information may be the EtherType field. Hereinafter, it is assumed that the second layer of the OSI 7 layer model is the MAC layer, and the field indicating IP version information is the EtherType field, although this need not be the case according to other aspects of the present invention.

Figure 9:
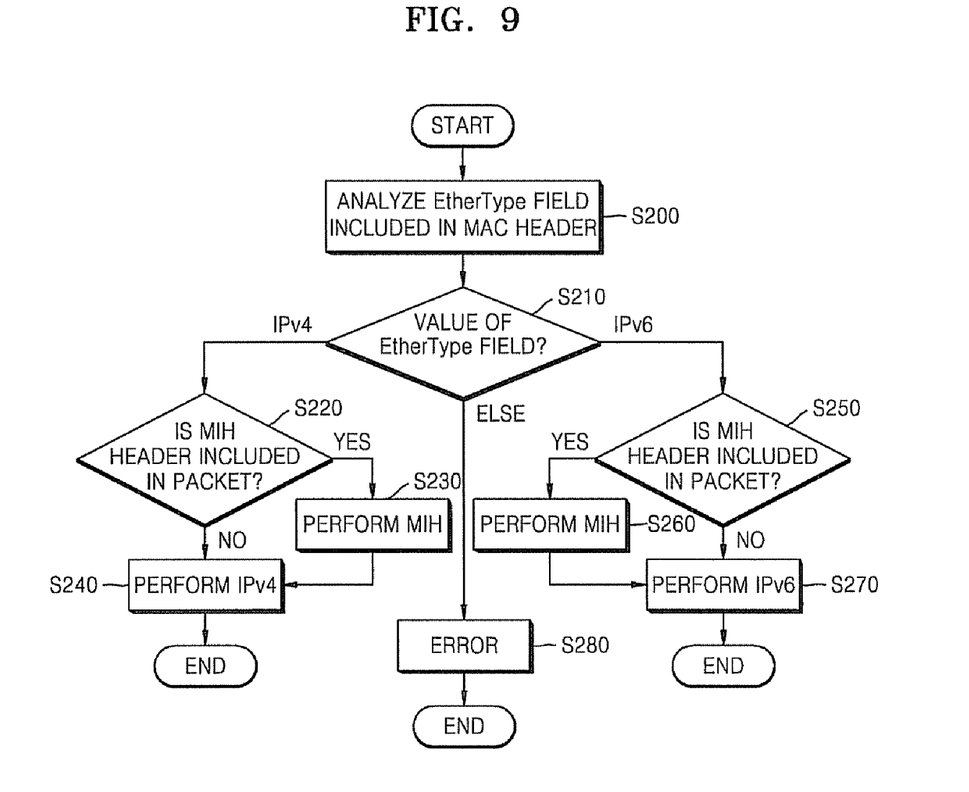
FIG. 9 is a flowchart of a process of performing MIH according to another example embodiment of the present invention.

FIG. 9 is a flowchart of a process of performing MIH according to another example embodiment of the present invention. The MAC header processing unit 310 analyzes an EtherType field included in a MAC field in a packet at block S200. The MAC header processing unit 310 transmits the packet to a module performing a process of a layer corresponding to a value of the EtherType field at block S210.

If the value of the EtherType field indicates IPv4, the MAC header processing unit 310 transmits the packet to the first determiner 325 of the IPv4 processing unit 320. The first determiner 325 determines at block S220 whether an MIH header is included in the packet. If the MIH header is included in the packet, the first determiner 325 transmits the packet to the MIH layer processing unit 340. The MIH layer processing unit 340 performs a process of an MIH layer at block S230 and transmits the packet to the IPv4 processing unit 320. The IPv4 processing unit 320 performs a process of an IPv4 layer at block S240 after the MIH layer processing unit 340 performs the process of the MIH layer.

If the MIH header is not included in the packet, the first determiner 325 transmits the packet to the IPv4 processing unit 320 directly. The IPv4 processing unit 320 performs the process of the IPv4 layer at block S240.

If the value of the EtherType field indicates IPv6, the MAC header processing unit 310 transmits the packet to the second determiner 335 of the IPv6 processing unit 330. The second determiner 335 determines at block S250 whether an MIH header is included in the packet. If the MIH header is included in the packet, the second determiner 335 transmits the packet to the MIH layer processing unit 340. The MIH layer processing unit 340 performs the process of the MIH layer at block S260 and transmits the packet to the IPv6 processing unit 330. The IPv6 processing unit 330 performs a process of an IPv6 layer at block S270 after the MIH layer processing unit 340 performs the process of the MIH layer.

If the MIH header is not included in the packet, the second determiner 335 transmits the packet to the IPv6 processing unit 330 directly. The IPv6 processing unit 330 performs the process of the IPv4 layer at block S270.

According to another example embodiment of the present invention, the EtherType field may only have a value indicating IPv4 or IPv6. Thus, if the EtherType field has another value, an error has occurred in the packet, and an error process is performed at block S280.

Aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. The computer readable recording medium can also be distributed over network coupled computer systems so that the computer readable code is stored and executed in a distributed fashion. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, according to aspects of the present invention, by assigning a new value corresponding to an MIH layer to a field indicating IP version information, an OSI layer 2 process can determine in advance whether MIHP information is included in a packet, or by determining in advance before an OSI layer 3 process is performed whether MIHP information is included in the packet, an IP layer that is the third layer of the OSI 7 layer model can determine whether an MIH process is performed without performing a separate operation. Thus, a delay of a processing speed of a device can be prevented, resulting in an increase of QoS of a network.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, aspects of the invention may be used in conjunction with models other than the OSI 7 layer model, such as the TCP/IP 5 layer model. Similarly, aspects of the invention may employ protocols other than IP, or need not utilize Media Access Control (MAC). Additionally, performing a process of a layer may indicate processing a header of a packet corresponding to the layer. Further, the apparatus 200 and the apparatus 300 may include a handover unit to perform MIH based on the results of the other processing units in the apparatus 200 and the apparatus 300. Accordingly, it is intended, therefore, that the present invention not be limited to the various example embodiments disclosed, but that the present invention includes all embodiments falling within the scope of the appended claims.

What is claimed is:

1. A method of performing Media Independent Handover (MIH) by a network device, the method comprising:
analyzing a field of a packet received by the network device indicating Internet Protocol (IP) version information;
performing a process of an MIH layer and performing a process of an IP layer if a value of the field indicating IP version information corresponds to the MIH layer, wherein the field indicating IP version information is an EtherType field other than 0x0800 and 0x86DD; and
performing the process of the IP layer directly if a value of the field indicating IP version information does not correspond to the MIH layer, wherein the EtherType field is one of 0x0800 and 0x86DD.

2. The method of claim 1, wherein the field indicating IP version information is included in a Media Access Control (MAC) header.

3. A method of performing Media Independent Handover (MIH) by a network device, the method comprising:
analyzing a field of a packet received by the network device indicating Internet Protocol (IP) version information;
determining whether an MIH header is included in the packet; and
performing only a process of an IP version 4 (IPv4) layer if it is determined that the MIH header is not included in the packet and if a value of the field indicating IP version information indicates the IPv4, wherein the field indicating IP version information is an EtherType field and is 0x0800, and performing a process of an MIH layer and the process of the IPv4 layer if it is determined that the MIH header is included in the packet, wherein the EtherType field is other than 0x0800 and 0x86DD; and
performing the process of an IP version 6 (IPv6) layer if it is determined that the MIH header is not included in the packet and if a value of the field indicating IP version information indicates the IPv6, wherein the field indicating IP version information is an EtherType field and is 0x86DD, and performing a process of an MIH layer and the process of the IPv6 layer if it is determined that the MIH header is included in the packet, wherein the EtherType field is other than 0x0800 and 0x86DD.

4. The method of claim 3, wherein the process of the IPv4 layer is performed directly if an MIH header is not included in the packet.

5. The method of claim 3, wherein the process of the IPv6 layer is performed directly if an MIH header is not included in the packet.

6. The method of claim 3, wherein the field indicating IP version information is included in a Media Access Control (MAC) header.

7. An apparatus to perform Media Independent Handover (MIH), the apparatus comprising:
a Media Access Control (MAC) header processing unit to analyze a field of a packet received by the apparatus indicating Internet Protocol (IP) version information;

an MIH layer processing unit to perform a process of an MIH layer if a value of the field indicating IP version information corresponds to the MIH layer; and an IP layer processing unit to perform a process of an IP layer after performing the process of the MIH layer if the value of the field for indicating IP version information corresponds to the MIH layer, wherein the field indicating IP version information is an EtherType field other than 0x0800 and 0x86DD, and to perform the process of the IP layer directly if the value of the field for indicating IP version information does not correspond to the MIH layer, wherein the EtherType field is one of 0x0800 and 0x86DD.

8. The apparatus of claim 7, wherein the field indicating IP version information is included in a Media Access Control (MAC) header.

9. An apparatus to perform Media Independent Handover (MIH), the apparatus comprising:
 a Media Access Control (MAC) header processing unit to analyze a field of a packet received by the apparatus indicating Internet Protocol (IP) version information;
 an MIH layer processing unit to perform a process of an MIH layer if an MIH header is included in a packet;
 an IP version 4 (IPv4) processing unit to perform a process of an IPv4 layer if a value of the field indicating IP version information indicates an IPv4, wherein the field indicating IP version information is an EtherType field and is 0x0800, and to transmit the packet to the MIH layer processing unit if the MIH header is included in the packet, wherein the EtherType field is other than 0x0800 and 0x86DD; and
 an IP version 6 (IPv6) layer processing unit to perform a process of an IPv6 layer if the value of the field for indicating IP version information indicates IPv6, wherein the field indicating IP version information is an EtherType field and is 0x86DD, and to transmit the packet to the MIH layer processing unit if an MIH header is included in the packet, wherein the EtherType field is other than 0x0800 and 0x86DD.

10. The apparatus of claim 9, wherein the field indicating IP version information is included in a Media Access Control (MAC) header.

11. A non-transitory computer readable recording medium storing a computer readable program to execute a method of performing Media Independent Handover (MIH) by a network device, the method comprising:
 analyzing a field of a packet received by the network device indicating Internet Protocol (IP) version information;
 performing a process of an MIH layer and performing a process of an IP layer if a value of the field indicating IP version information corresponds to the MIH layer, wherein the field indicating IP version information is an EtherType field other than 0x0800 and 0x86DD; and
 performing the process of the IP layer directly if a value of the field indicating IP version information does not correspond to the MIH layer, wherein the EtherType field is one of 0x0800 and 0x86DD.

12. The apparatus of claim 9, wherein the IPv4 processing unit comprises a determiner to determine if the packet includes an MIH header and to transmit the packet to the MIH layer processing unit if the packet includes an MIH header.

13. The apparatus of claim 9, wherein the IPv6 processing unit comprises a determiner to determine if the packet includes an MIH header and to transmit the packet to the MIH layer processing unit if the packet includes an MIH header.

* * * * *